Dec. 17, 1929. R. M. CORMICAN Re. 17,529

COMBINATION TRUNK AND LUGGAGE CARRIER

Original Filed Sept. 23, 1927 2 Sheets-Sheet 1

Witness
L. F. Hammand

Inventor
R. M. Cormican
by Bair Freeman & Sinclair
Attorneys

Dec. 17, 1929. R. M. CORMICAN Re. 17,529

COMBINATION TRUNK AND LUGGAGE CARRIER

Original Filed Sept. 23, 1927 2 Sheets-Sheet 2

Inventor
R. M. Cormican
by Bair, Freeman & Sinclair
Attorneys

Witness
L. H. Hammond

Reissued Dec. 17, 1929

Re. 17,529

UNITED STATES PATENT OFFICE

ROBERT M. CORMICAN, OF CASEY, ILLINOIS, ASSIGNOR TO KARI-KEEN MANUFACTURING COMPANY, INC., OF SIOUX CITY, IOWA, A CORPORATION OF DELAWARE

COMBINATION TRUNK AND LUGGAGE CARRIER

Original No. 1,687,427, dated October 9, 1928, Serial No. 221.561, filed September 23, 1927. Application for reissue filed September 20, 1929. Serial No. 394,097.

This invention relates to vehicle trunks, and its general object is to provide a trunk adapted to be fixed to the rear of a motor vehicle, having a luggage carrier foldably associated therewith in a manner whereby the trunk cooperates with the luggage carrier for carrying the same in folded or open position.

A further object of my invention is to provide a luggage carrier hingedly mounted upon a fixed trunk section or support and adapted to be moved from a substantially vertical inoperative position to a substantially horizontal operative position.

A further object of the invention is to provide a combined trunk and luggage carrier of the character above set forth, that is capable of carrying a great amount of material in a safe and secure manner, yet is neat in appearance regardless of whether or not the carrier is in its folded or open position.

Still a further object is to provide a combination trunk and luggage carrier, wherein the parts may assume the position of a normal and ordinary trunk structure and which parts may be moved to still another position for forming a luggage carrier for conveniently supporting articles of comparatively large size. It is also my object to provide a device which can be used independently as a trunk and independently as a luggage carrier so that the entire device may be used at one time for carrying loads of maximum quantity and may also be used as a normal trunk irrespective of the extension feature without movement of any parts forming the extension or luggage feature of my device.

Another object of the invention is to provide a trunk and luggage carrier for a motor vehicle, that is simple in construction, inexpensive to manufacture and efficient in operation and service.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 3:
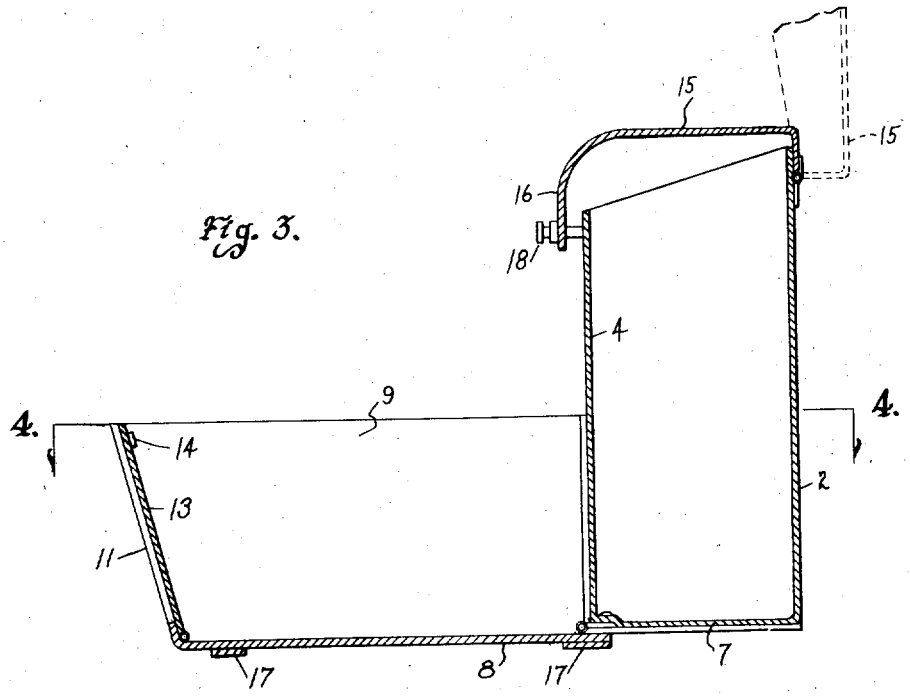
Figure 3 is a similar view thereof in open position, and showing the top closed in full lines and open in dotted lines.

Referring to the drawings in detail, it will be noted that the device is supported upon a platform 1 extending from the rear of the vehicle as shown, and the device includes a receptacle in the form of the usual vehicle trunk. This may be referred to as a fixed trunk section. The receptacle is formed with a rear wall 2 arranged in confronting engagement with the back of the vehicle, side walls 3 and front wall 4. The side walls 3 are inclined so as to dispose the upper edge of the rear wall above the upper edge of the front wall as best shown in Figure 3 of the drawings.

Figure 4:
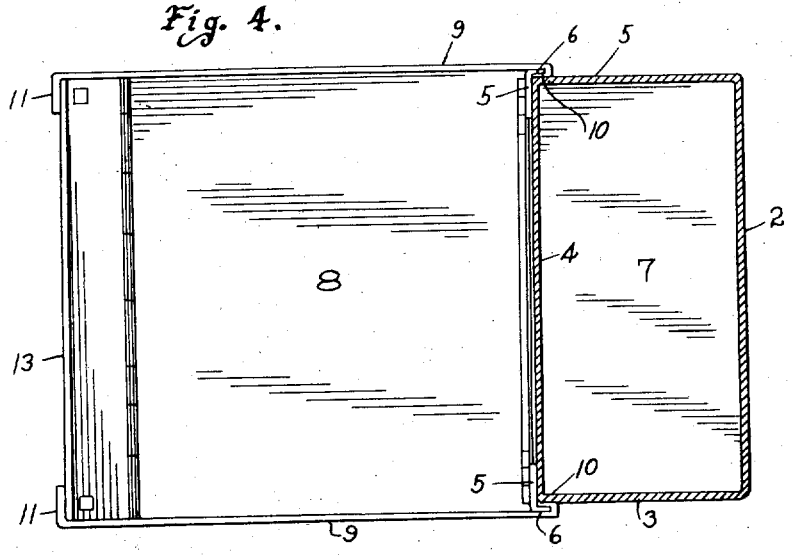
Figure 4 is a sectional view taken approximately on line 4—4 of Figure 3, looking in the direction of the arrows.

Secured to the front wall and at its juncture with the side walls of the trunk and extending from the bottom and terminating adjacent the central portion thereof are strips 5 of substantially cross sectional L-shape formation with portions 6 disposed in spaced relation with respect to the side walls as best shown in Figure 4.

Hingedly secured to the bottom 7 of the trunk for movement in a vertical plane is one edge of the bottom 8 of the luggage carrier or movable section as shown. Upwardly extending side walls 9 project from the bottom 8 and have their inner edges bent upon themselves to provide tongues 10 adapted to receive the portions 6 and be disposed between said portions and the side walls 3 for supporting the luggage carrier in its open position. The bottom 8 of the luggage carrier section thus moves from a substantially vertical position to a horizontal position and when in this last position serves as a luggage carrier.

The luggage carrier is also provided with a wall 11 formed at the free end of the bottom and side walls 9 thereof, and this wall 11 has its greatest portion cut away to provide a recess or an open ended portion 12 for a purpose which will be presently apparent. The recess is closed by a door or wall 13 hingedly secured to the bottom 8 and said door is adapted to be disposed in closed position when the luggage carrier is arranged in its open position as shown in Figures 3 and 4. The door may be detachably secured in its closed position through the instrumentality of snap fasteners 14 or fasteners of any general type. The wall 13 when fastened in position serves to prevent the side walls 3 from outward bending movement.

Figure 1:
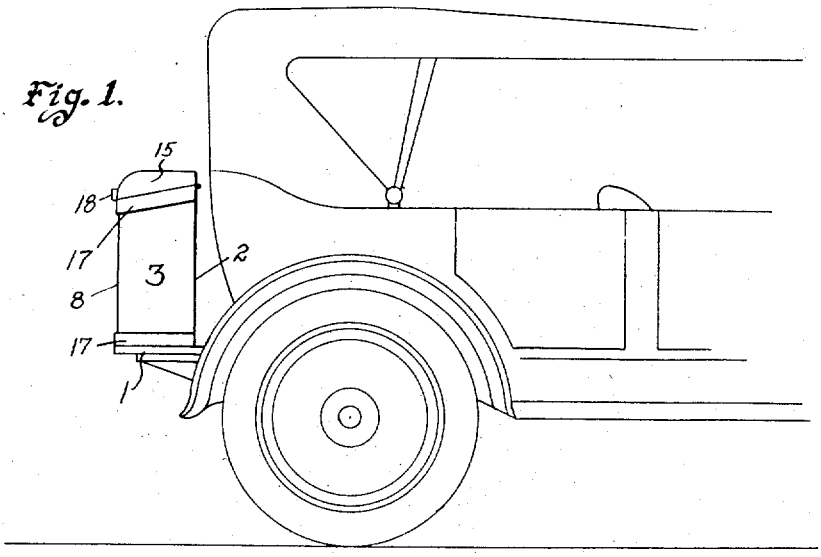
Figure 1 is a fragmentary side elevation of a motor vehicle showing the device which forms the subject matter of the present invention applied thereto.
Figure 2:
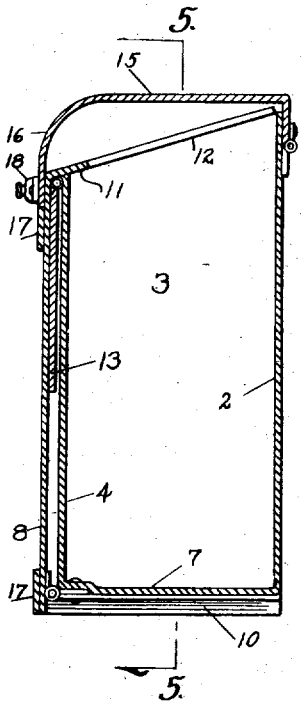
Figure 2 is a vertical sectional view taken through the device in folded position.
Figure 5:
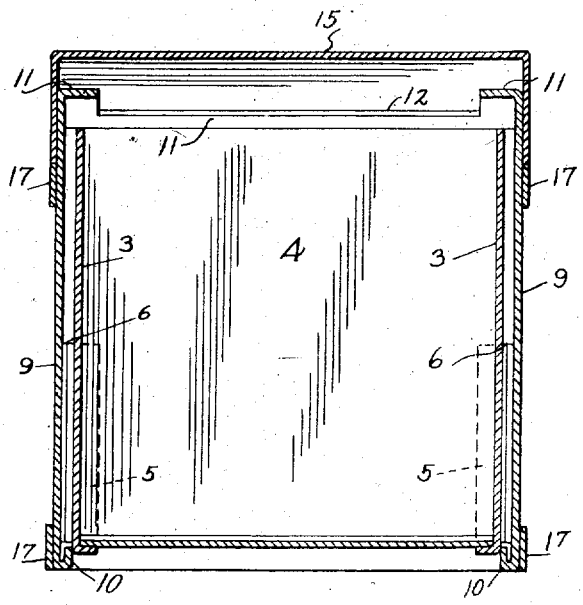
Figure 5 is a sectional view taken approximately on the line 5—5 of Figure 2, looking in the direction of the arrows.

Hingedly secured to the rear wall 2 of the trunk is a flanged cover 15, and the cover is of a size to position the forward flange 16 thereof in spaced relation with the front wall 4 of the trunk when the luggage carrier is disposed in open position, but when the carrier is arranged in folded position, the forward flange 16 as well as the side flanges thereof engage the free end portion of the bottom and the sides of the luggage carrier as shown in Figure 2 of the drawings. This is an important feature in that the luggage section is retained in inoperative position. The luggage carrier is provided with reinforcing strips 17 formed at the secured end and free end thereof and the reinforcing strip which is arranged at the free end thereof provides a stop for the cover of the trunk. When the device is disposed in folded position, the bottom of the luggage carrier provides the front of the device and in order to arrange the luggage carrier in folded position, the door 13 is positioned in contacting engagement with the bottom 8 and the carrier is disposed upwardly on its hinges and telescopically receives the trunk or fixed section as shown, and when in this position, the opening 12 in the wall 11 provides the means of access to the interior of the trunk.

The wall 11 together with the end member or door 13 provides a complete end closure for the luggage carrier section. The door or wall 13 is arranged to be substantially parallel to the bottom 8 when in inoperative position. The hinge connection of the door 13 to the bottom 8 is an important feature because it permits movement of the door relative to the bottom in assuming its two different positions. The cover may be secured in closed position by an appropriate securing means and I have illustrated a latch 18 for this purpose.

It will be apparent from the foregoing that the entire device may be used to carry luggage or the fixed trunk section used alone and in that case the appearance is similar to an ordinary trunk. The movable section when in open position may carry luggage. It will be noted that the luggage carrier is hingedly connected to the fixed section and supports luggage when it is in open position. The device can be used strictly as a trunk, that is without movement of the luggage carrier or movable section.

From the above description and disclosure in the drawings it will be obvious that I have provided a combined trunk and luggage carried adapted to be supported at the rear of a vehicle in the usual manner, and provides a neat appearance regardless of whether or not the device is in folded or open position. Due to the novel construction of the luggage carrier and its association with the trunk, it will in no way affect the use of the trunk when in folded position or when disposed to its open position.

It is thought from the foregoing description that the advantages and novel features of my invention will be readily apparent.

Some changes may be made in the construction and arrangement of the parts of my device without departing from the real spirit and purpose of my invention, and it is my intention to cover by my claims, any modified form of structure or use of mechanical equivalents, which may be reasonably included within their scope.

I claim as my invention:

1. An attachment for motor vehicles, comprising a trunk including a rear wall, front wall, side walls and a bottom, a luggage carrier including side walls, a bottom and a front wall, said front wall being recessed, a door for closing said recess, said luggage carrier being hingedly secured for movement in a vertical plane, and telescopically receiving said trunk when arranged in closed position, said luggage carrier being disposed in a horizontal position when open, and a cover for said trunk and capable of retaining said luggage carrier in its folded position.

2. An attachment for motor vehicles comprising a trunk-like section having a bottom, a rear wall and side walls, a luggage carrier section hingedly connected to said trunk section, said carrier section having a bottom, side walls and a front wall, said front wall being hinged to said carrier bottom along one edge thereof, said front wall being arranged when the luggage carrier is in inoperative position to lie substantially parallel to said carrier bottom and when in operative position at substantially right angles thereto and a cover for said trunk and capable of retaining said luggage carrier in its inoperative position.

3. An attachment for motor vehicles comprising a fixed support, a luggage carrier section hinged thereto and movable from a vertical to a substantially horizontal position, said carrier having a bottom wall, a pair of side walls projecting upwardly from said bottom and a third wall hinged to said bottom along one edge thereof and adapted to assume a position at right angles to the bottom when in use and parallel thereto when not in use, said third wall serving as a closure between said pair of side walls and movable between said pair of side walls.

4. An attachment for motor vehicles comprising a fixed support, a luggage carrier section hinged thereto and movable from a vertical to a substantially horizontal position, said carrier having a bottom wall, a pair of side walls projecting upwardly from said bottom secured thereto and movable therewith as a unit and a third wall hinged to said bottom along one edge thereof and adapted to assume a position at right angles to the bottom when in use and parallel thereto when not in use, said third wall serving as a closure between said pair of side walls, and fastening means for retaining said third wall in its position substantially at right angles to said bottom.

5. An attachment for motor vehicles comprising a fixed support, a luggage carrier section hinged thereto and movable from a vertical to a substantially horizontal position, said carrier having a bottom wall, a pair of side walls projecting upwardly from said bottom and movable therewith and carried thereby and a third wall hinged to said bottom along one edge thereof and adapted to assume a position at right angles to the bottom when in use and parallel thereto when not in use, said third wall serving as a closure between said pair of side walls, and plural fastening means for retaining said third wall in a substantially upright position and means hinged to said fixed support adapted to overlie said carrier section when in inoperative position along the hinged connection between said bottom and said third wall.

6. An attachment for motor vehicles comprising a trunk-like section having a bottom, a rear wall and side walls, a luggage carrier section hingedly connected to said trunk section, said carrier section having a bottom, side walls and a front wall, said front wall being hinged to said bottom along one edge thereof, said front wall being arranged when the luggage carrier is in inoperative position to lie substantially parallel thereto and when in operative position at substantially right angles thereto, fastening means for retaining said front wall in said last position and for tying said side walls against outward bending, and a cover for said trunk engageable with said luggage carrier when in its inoperative position.

7. An attachment for motor vehicles, comprising a trunk section including a rear wall, side walls and a bottom, a luggage carrier including side walls, a bottom and an open front, a closure for closing said open front, said closure being hingedly connected to the bottom of the carrier, said luggage carrier being hingedly secured for movement in a vertical plane, and telescopically receiving said trunk when arranged in closed position, said luggage carrier being disposed in a horizontal position when open, and a cover for said trunk and capable of retaining said luggage carrier in its folded position.

8. An attachment for motor vehicles, comprising a trunk section including a rear wall, side walls and a bottom, a luggage carrier including side walls, a bottom and an open front, a closure for closing said open front, said closure being hingedly connected to the bottom of the carrier, said luggage carrier being hingedly secured for movement in a vertical plane, said luggage carrier being disposed in a horizontal position when open, and a cover for said trunk and capable of retaining said luggage carrier in its folded position and affording access to the interior of said trunk section.

9. An attachment for motor vehicles, comprising a trunk section including a rear wall, side walls and a bottom, a luggage carrier including side walls, a bottom and an open front, a closure for closing said open front, said closure being hingedly connected to the bottom of the carrier, fastening elements for retaining said closure against hinged movement when in operative position, said luggage carrier being hingedly secured for movement in a vertical plane, and telescopically receiving said trunk when arranged in closed position, said luggage carrier being disposed in a horizontal position when open, and a cover hinged to said trunk movable for affording access thereto and capable of retaining said luggage carrier in its folded position.

10. An attachment for motor vehicles comprising a fixed support, a luggage carrier movable relative thereto, the luggage carrier including a pair of elements hinged together, one of said elements constituting a bottom for said luggage carrier and the other element being adapted to selectively assume a position parallel with the bottom element or a position substantially at right angles thereto, side walls extending upwardly from said bottom element and coacting means between said side walls and said other element for retaining the other element in its last mentioned position, said last element being movable between said side walls when the side walls project upwardly from the bottom element and said means being located adjacent the upper edge of said element and the rear edges of said side walls.

11. A combination trunk and luggage carrier comprising a pair of sections, one being adapted to be fixedly carried upon the rear end of an automobile and the other hingedly supported upon said first section, said last section including a bottom movable from a vertical to a horizontal position, an end wall operatively connected to said botom by a hinge connection whereby it is adapted to be positioned substantially vertical in either position of said bottom wall and side walls positioned along the side edges of said bottom for defining a box-like structure for carrying luggage and a cover for said trunk section, movable for affording access thereto in either position of the other section.

12. A combination trunk and luggage carrier comprising a pair of sections, one being adapted to be fixedly carried upon the rear end of an automobile and the other hingedly supported upon said first section, said last section including a bottom movable from a vertical to a horizontal position, side walls positioned along the side edges of said bottom, an end wall operatively connected to said bottom, by a hinge connection, whereby it is movable between said side walls within the section of which it is a part and adapted to be positioned substantially vertical in either position of said bottom wall, means of connection between said fixed section and the other of said sections for supporting the latter in luggage carrying position and detachable means of connection betwen said end wall and said side walls.

13. A combination trunk and luggage carrier comprising a pair of sections, one being adapted to be fixedly carried upon the rear end of an automobile and the other hingedly supported upon said first section, said first section including end walls and a bottom wall and said second section also including side walls and a bottom wall, the walls of the second section forming a continuation of the walls of the first section when the second section assumes a luggage supporting position and an end wall connected to said second section movable between the side walls thereof adapted to be positioned substantially vertical in either position of said bottom wall.

14. A combination trunk and luggage carrier comprising a pair of sections, one being adapted to be fixedly carried upon the rear end of an automobile and the other hingedly supported upon said first section, said first section including end walls and a bottom wall and said second section also including side walls and a bottom wall, the walls of the second section forming a continuation of the walls of the first section when the second section assumes a luggage supporting position and an end wall in said second section hinged to said bottom wall and extending between the side walls thereof adapted to be positioned substantially vertical in either position of said bottom wall, cooperating means included in said sections for supporting the second section relative to said first section for carrying luggage and a cover hingedly carried by said first section for retaining said second section in its inoperative position and affording access to the interior of said first section when the second section is in such position.

15. A combination trunk and luggage carrier comprising a pair of sections, one being adapted to be fixedly carried upon the rear end of an automobile and the other hingedly supported upon said first section, said first section including end walls and a bottom wall and said second section also including side walls and a bottom wall, the walls of the second section forming a continuation of the walls of the first section when the second section assumes a luggage supporting position and an end wall in said second section hinged to said bottom wall and extending between the side walls thereof adapted to be positioned substantially vertical in either position of said bottom wall, and cooperating means included in said sections for supporting the second section relative to said first section for carrying luggage and a cover hingedly carried by said first section and adapted to overlap said second section in its inoperative position, to prevent movement of said second section to operative position except when its cover means is raised, said cover means also affording access to the interior of said first section.

16. A combination trunk and luggage carrier comprising a pair of sections, one being adapted to be fixedly carried upon the rear end of an automobile and the other hingedly supported upon said first section, said last section including a bottom movable from a vertical to a horizontal position, an end wall operatively connected to said bottom and movable therewith and adapted to be positioned substantially vertical in either position of said bottom wall, means for supporting said second section with respect to said first section when in luggage carrying position and a cover hingedly connected to said first section and forming a part thereof and engaging said second section in its inoperative position and movable to a position affording access to the interior of said first section.

17. In a device of the class described, a support fixedly carried upon the rear end of an automobile, a luggage carrier section hingedly connected to and movably supported relative to said support, said carrier section including side walls, a bottom and an end wall, said end wall being hingedly connected to the bottom of said section and movable between said side walls, means of connection between said end wall and said side walls for preventing outward bending of the side walls when under pressure of a load, said luggage carrier section forming a compartment independent of said support for retaining luggage.

18. In a device of the class described, a trunk section fixedly carried upon the rear end of an automobile, a luggage carrier section hingedly connected to and movably supported relative to said trunk section, said carrier section including side walls, a bottom and an end wall, said end wall being hingedly connected to the bottom of said section and movable between said side walls, means of connection between said end wall and said side walls for preventing outward bending of the side walls when under pressure of a load, said luggage carrier section forming a compartment independent of said trunk section for retaining luggage.

19. In a device of the class described, a trunk section fixedly carried upon the rear end of an automobile, a luggage carrier section hingedly connected to and movably supported relative to said trunk section, said carrier section including side walls, a bottom and an end wall, said end wall being hingedly connected to the bottom of said section, means of connection between said end wall and said side walls for preventing outward bending of the side walls when under pressure of a load, said luggage carrier section forming a compartment independent of said trunk section for retaining luggage, and said trunk section providing a compartment independent of said carrier section for retaining luggage.

20. In a device of the class described, a trunk section fixedly carried upon the rear end of an automobile, a luggage carrier section hingedly connected to and movably supported relative to said trunk section, said carrier section including side walls, a bottom and an end wall, said end wall being hingedly connected to the bottom of said section, means of connection between said end wall and said side walls for preventing outward bending of the side walls when under pressure of a load, said luggage carrier section forming a compartment independent of said trunk section for retaining luggage, and said trunk section providing a compartment independent of said carrier section for retaining luggage and a hinged cover for said trunk section.

Des Moines, Iowa, September 7, 1929.

ROBERT M. CORMICAN.